US012346235B2

(12) United States Patent
Sasaki et al.

(10) Patent No.: US 12,346,235 B2
(45) Date of Patent: Jul. 1, 2025

(54) SEMICONDUCTOR CHIP, DEBUG SYSTEM, AND SYNCHRONIZATION METHOD

(71) Applicant: RENESAS ELECTRONICS CORPORATION, Tokyo (JP)

(72) Inventors: Hiroyuki Sasaki, Tokyo (JP); Hirofumi Hatahara, Tokyo (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 55 days.

(21) Appl. No.: 18/482,241

(22) Filed: Oct. 6, 2023

(65) Prior Publication Data

US 2024/0168861 A1 May 23, 2024

(30) Foreign Application Priority Data

Nov. 21, 2022 (JP) ................. 2022-185608

(51) Int. Cl.
*G06F 11/00* (2006.01)
*G06F 11/32* (2006.01)
*G06F 11/34* (2006.01)

(52) U.S. Cl.
CPC .......... *G06F 11/348* (2013.01); *G06F 11/323* (2013.01); *G06F 11/3476* (2013.01)

(58) Field of Classification Search
CPC ... G06F 11/348; G06F 11/323; G06F 11/3476
See application file for complete search history.

(56) References Cited

U.S. PATENT DOCUMENTS 8,935,574 B2 * 1/2015 Bedwell .............. G06F 11/3466
714/33
10,243,568 B2 * 3/2019 Yamada ............... H03K 21/406

FOREIGN PATENT DOCUMENTS

JP 2013-109621 A 6/2013

* cited by examiner

*Primary Examiner* — Amine Riad
(74) *Attorney, Agent, or Firm* — Rimon P.C.

(57) ABSTRACT

A semiconductor chip includes a first common marker generating circuit and a second common marker generating circuit. The first common marker generating circuit is configured to send a first request signal to the second common marker generating circuit, the first request signal requesting a common marker to be sent to a second trace memory, and to send the common marker to a first trace memory, when a second request signal is received from the second common marker generating circuit, the second request signal requesting the common marker to be sent to the first trace memory. The second common marker generating circuit is configured to send the common marker to the second trace memory and to send the second request signal to the first common marker generating circuit, if a second core is running a user program at a time when the first request signal is received.

9 Claims, 4 Drawing Sheets

| | TIME | ROW NUMBER | SOURCE | ADDRESS | DATA |
|---|---|---|---|---|---|
| 41 | *h *min *s *μs *ns | 0xffff*** | +123 CMP SAM,R1 | 0x200* | |
| 42 | | | | | |
| 43 | *h *min *s *μs *ns | 0xffff*** | +128 ELT sort+* | 0x200* | |
| 44 | *h *min *s *μs *ns | | | 0x200* | R*** |
| 45 | *h *min *s *μs *ns | | | 0x200* | R*** |
| 46 | | | | 0x200* | 10 |
| 47 | *h *min *s *μs *ns | | +128 ELT sort+* | | |
| 48 | | 0xffff*** | +123 CMP SAM,R1 | | |
| 49 | | sort.*** | | | |

SEMICONDUCTOR CHIP, DEBUG SYSTEM, AND SYNCHRONIZATION METHOD

CROSS-REFERENCE TO RELATED APPLICATIONS

The disclosure of Japanese Patent Application No. 2022-185608 filed on Nov. 21, 2022 including the specification, drawings and abstract is incorporated herein by reference in its entirety.

BACKGROUND

The present invention relates to a semiconductor chip, a debug system, and a synchronization method.

There is disclosed a technique listed below.

[Patent Document 1] Japanese Unexamined Patent Application Publication No. 2013-109621

The development support apparatus described in Patent Document 1 includes a trace message generation circuit (also referred to as a trace control circuit) that generates a trace message in which trace data and a timestamp are associated with each other. The trace message generation circuit described in Patent Document 1 is configured to receive trace data from each of multi-cores.

SUMMARY

In a heterogeneous multi-core (also referred to as a hetero-multi-core), the trace data specification is established per core and the instruction sets are different among cores, therefore it is efficient to diverse a trace control circuit designed per core. In other words, it is difficult in the hetero-multi-core to provide a trace circuit that is common among cores as in Patent Document 1. Since clocks are different among cores in the hetero-multi-core, trace control circuits on a plurality of cores each run on different clocks.

On the other hand, when displaying trace data from a multi-core microcomputer, trace data from the plurality of cores are desired to be displayed in synchronization. However, it has been difficult in the hetero-multi-core to synchronize trace data from the plurality of cores, since it is difficult to perform synchronization using timestamp values based on different clocks.

Moreover, when performing synchronizing using timestamp values, the timestamp value associated with the trace data from one core is required to match the timestamp value associated with the trace data from the other core. However, it is not guaranteed that there are two pieces of trace data associated with the same timestamp. Hence, it has been difficult on the hetero-multi-core to synchronize trace data by using timestamp values.

Other problems and novel features will become apparent from the description of the present specification and the accompanying drawings.

According to an embodiment, a semiconductor chip includes a first common marker generating circuit and a second common marker generating circuit. The first common marker generating circuit sends a first request signal to the second common marker generating circuit, the first request signal requesting a common marker to be sent to a second trace memory, when a first core is running a user program, and sends the common marker to a first trace memory, when a second request signal is received from the second common marker generating circuit, the second request signal requesting the common marker to be sent to the first trace memory. The second common marker generating circuit sends the common marker to the second trace memory and sends the second request signal to the first common marker generating circuit, if a second core is running a user program at a time when the first request signal is received.

According to an embodiment, a debug system includes a semiconductor chip and a host computer configured to display trace data from a first core and trace data from a second core in synchronization based on a common marker.

According to an embodiment, a synchronization method includes a step of, when a first core is running a user program, sending a first request signal from a first common marker generating circuit to a second common marker generating circuit, the first request signal requesting a common marker to be sent to a second trace memory. Also, the synchronization method includes a step of, if a second core is running a user program at a time when the second common marker generating circuit receives the first request signal, sending a second request signal from the second common marker generating circuit to the first common marker generating circuit, the second request signal requesting the common marker to be sent to a first trace memory, and sending the common marker from the second common marker generating circuit to the second trace memory. Further, the synchronization method includes a step of, when the first common marker generating circuit receives the second request signal, sending the common marker from the first common marker generating circuit to the first trace memory.

According to the embodiment, the trace data from the plurality of cores can be synchronized on the hetero-multi-core.

DETAILED DESCRIPTION

Figure 1:
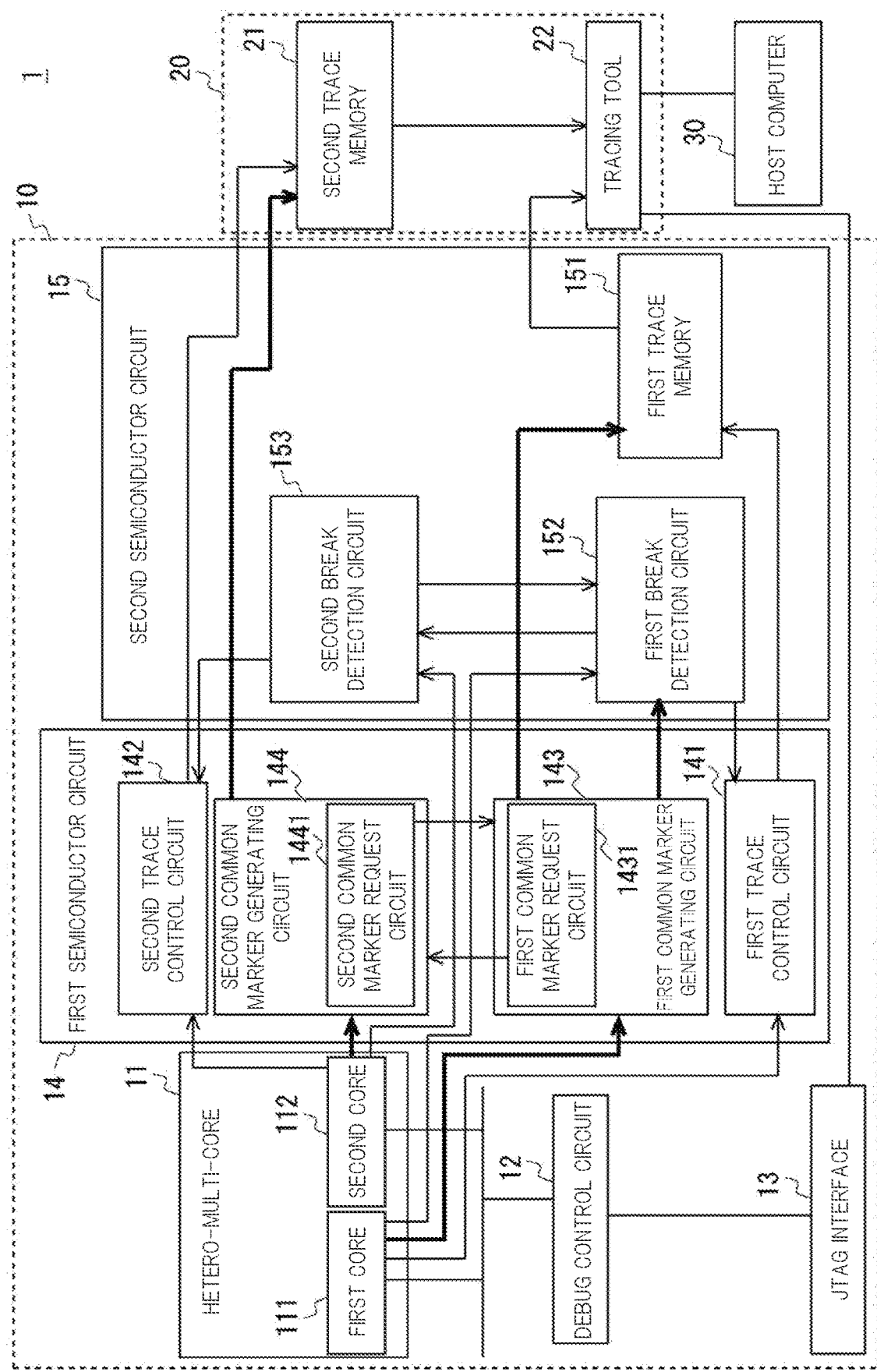
FIG. 1 is a block diagram illustrating a configuration of a debug system according to a first embodiment.

FIG. 1 is a block diagram illustrating a configuration of a debug system 1 according to a first embodiment. The debug system 1 includes a semiconductor chip 10, an emulator 20, and a host computer 30.

The semiconductor chip 10 includes a hetero-multi-core 11, a debug control circuit 12, a Joint Test Action Group (JTAG) interface 13, a first semiconductor circuit 14, and a second semiconductor circuit 15. The semiconductor chip 10 is a target chip on which the hetero-multi-core 11 to be targeted is mounted.

The hetero-multi-core 11 is a heterogeneous multi-core, and includes a first core 111 and a second core 112. The type of the first core 111 and the type of the second core 112 are different from each other.

The operating clock on the first core 111 and the operating clock on the second core 112 are different from each other.

A first trace control circuit 141, a first common marker generating circuit 143, and a first break detection circuit 152, which are to be described below, may operate in synchronization with the clock on the first core 111. A second trace control circuit 142, a second common marker generating circuit 144, and a second break detection circuit 153, which are to be described below, may operate in synchronization with the clock on the second core 112.

The debug control circuit 12 is a dedicated circuit configured to control debugging on the hetero-multi-core 11.

The JTAG interface 13 is an interface for a communication signal conforming to the JTAG standard.

The first semiconductor circuit 14 includes the first trace control circuit 141, the second trace control circuit 142, the first common marker generating circuit 143, and the second common marker generating circuit 144.

The first trace control circuit 141 acquires trace data (referred to as first trace data) from the first core 111 and sends the trace data to a first trace memory 151 included in the second semiconductor circuit 15. As in Patent Document 1, the first trace control circuit 141 may provide a timestamp to the first trace data.

The second trace control circuit 142 acquires trace data (referred to as second trace data) from the second core 112 and sends the trace data to a second trace memory 21 included in the emulator 20. As in Patent Document 1, the second trace control circuit 142 may provide a timestamp to the second trace data.

The first common marker generating circuit 143 is a circuit configured to send a common marker, based on which the first trace data and the second trace data are synchronized with each other, to the first trace memory 151. The first common marker generating circuit 143 includes a first common marker request circuit 1431.

Upon receiving a second request signal, requesting a common marker to be sent from the first common marker generating circuit 143 to the first trace memory 151, from the second common marker generating circuit 144, the first common marker generating circuit 143 sends the common marker to the first trace memory 151. The common marker may be included in the second request signal. The common marker may be an ID value (e.g., an integer between 1 and 16 inclusive) generated by using a second counter (not illustrated) included in the second common marker generating circuit 144.

When the first core 111 is running a user program, the first common marker request circuit 1431 sends a first request signal, requesting the common marker to be sent from the second common marker generating circuit 144 to the second trace memory 21, to the second common marker generating circuit 144. The first common marker request circuit 1431 may send the first request signal at regular intervals to the second common marker generating circuit 144 while the first core 111 is running a user program.

Note that a detailed configuration of the first common marker generating circuit 143 will be described later.

The second common marker generating circuit 144 is a circuit configured to send the common marker to the second trace memory 21. The second common marker generating circuit 144 includes a second common marker request circuit 1441 and a second counter (not illustrated).

If the second core 112 is running a user program at a time when the first request signal is received, the second common marker generating circuit 144 sends a common marker to the second trace memory 21. The common marker is generated by using the second counter (not illustrated).

If the second core 112 is running a user program at a time when the first request signal is received, the second common marker request circuit 1441 sends a second request signal to the first common marker generating circuit 143.

The second semiconductor circuit 15 includes the first trace memory 151, the first break detection circuit 152, and the second break detection circuit 153. The second semiconductor circuit 15 may be constructed by using related technology.

The first trace memory 151 stores first trace data and a common marker. The first trace data and the common marker are stored in the first trace memory 151 in the order they are input. The memory size of the first trace memory 151 is smaller than the memory size of the second trace memory 21.

The first break detection circuit 152 is configured to monitor the user program running on the first core 111 to detect a set breakpoint. Upon detecting the breakpoint, the first break detection circuit 152 causes the first core 111 to stop the user program running. Moreover, upon detecting the breakpoint, the first break detection circuit 152 causes the first trace control circuit 141 to stop the operation. The first break detection circuit 152 may output the breakpoint detection result to the second break detection circuit 153 and cause the second core 112 to relay break.

The second break detection circuit 153 monitors the user program running on the second core 112 to detect the set breakpoint. Upon detecting the breakpoint, the second break detection circuit 153 causes the second core 112 to stop the user program running. Moreover, upon detecting the breakpoint, the second break detection circuit 153 causes the second trace control circuit 142 to stop the operation. The second break detection circuit 153 may output the breakpoint detection result to the first break detection circuit 152 to cause the first core 111 to relay break.

The emulator 20 includes the second trace memory 21 and a tracing tool 22.

The second trace memory 21 stores second trace data and a common marker. The second trace data and the common marker are stored in the second trace memory 21 in the order they are input. The memory size of the second trace memory 21 is larger than the memory size of the first trace memory 151.

The tracing tool 22 supports debugging of a user program that is to run on the first core 111 and on the second core 112. The tracing tool 22 causes the first core 111 and the second core 112 to run the user program via the JTAG interface 13 under the control of the host computer 30. The tracing tool 22 reads out data from the first trace memory 151 or from the second trace memory 21 under the control of the host computer 30.

The host computer 30 is connected to the semiconductor chip 10 via the emulator 20. A debugger software is running on the host computer 30. The host computer 30 includes a display device such as a monitor or a display.

The host computer 30 is configured to read out first trace data and a common marker from the first trace memory 151 via the tracing tool 22. The host computer 30 is also configured to read out second trace data and a common marker from the second trace memory 21 via the tracing tool 22. The host computer 30 is configured to display the first trace data and the second trace data in synchronization based on the common marker.

Note that the first trace memory 151 is provided on the semiconductor chip 10 and the second trace memory 21 is provided on the emulator 20 in FIG. 1, but both the first trace memory 151 and the second trace memory 21 may be provided on the semiconductor chip 10. Alternatively, both the first trace memory 151 and the second trace memory 21 may be provided on the emulator 20.

Next, an example of an operation of the debug system 1 will be described with reference to FIG. 2. First of all, the first core 111 starts to run a user program, and first trace data is started to be recorded into the first trace memory 151 (Step S101). The first trace memory 151 records the first trace data according to the clock on the first core 111.

At this time, the second core 112 is assumed to have stopped the user program running. In this case, the second trace data is stopped from being recorded into the second trace memory 21 (Step S102).

Since the first core 111 is running the user program, the first common marker generating circuit 143 sends a first request signal to the second common marker generating circuit 144 (Step S103). The second core 112 is not running the user program at a time when the second common marker generating circuit 144 receives the first request signal. Hence, the second common marker generating circuit 144 does not send the common marker to the second trace memory 21 and does not send the second request signal to the first common marker generating circuit 143. If the value of the second counter is "1" at this time, then a common marker with an ID value of "1" is not generated. The first trace memory 151 continues the recording of the first trace data.

Next, the second core 112 is assumed to have started to run a user program and second trace data is started to be recorded into the second trace memory 21 (Step S104). The second trace memory 21 records the second trace data according to the clock on the second core 112.

The first common marker generating circuit 143 sends the first request signal again to the second common marker generating circuit 144 since the first core 111 is running the user program (Step 105). At a time when the second common marker generating circuit 144 receives the first request signal, the second core 112 is running the user program. Accordingly, the second common marker generating circuit 144 sends a common marker to the second trace memory 21 (Step S106). If the value of the second counter is "2", then a common marker with an ID value of "2" is generated. Thus, the second common marker generating circuit 144 sends a second request signal to the first common marker generating circuit 143 (Step S107). The second request signal includes the common marker (ID value).

The first common marker generating circuit 143 receives the second request signal including the common marker (e.g., "2") and sends the received common marker to the first trace memory 151 (Step S108).

When the first core 111 stops the user program running, the first trace memory 151 stops the recording of the first trace data (Step S109). Since the first core 111 is not running the user program, the first common marker generating circuit 143 does not send the first request signal to the second common marker generating circuit 144. Then, the second core 112 stops operating due to synchronous break (relay break), and the second trace memory 21 stops the recording of the second trace data (Step S110). The recorded first trace data and second trace data can be displayed in synchronization based on the common marker.

Figure 2:
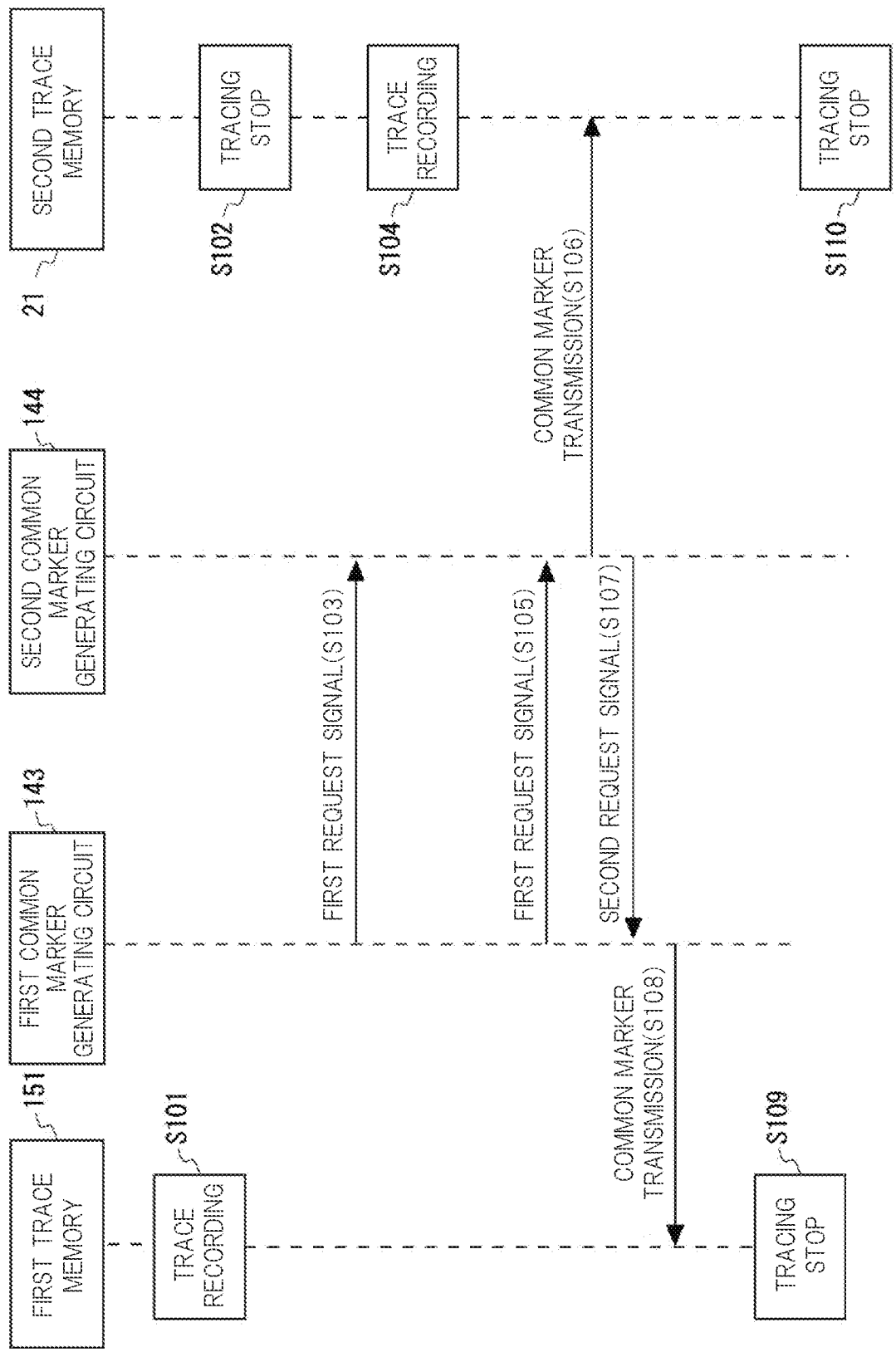
FIG. 2 is a sequence diagram illustrating a flow of a synchronization method according to the first embodiment.

The reason why the first request signal is sent from the first common marker generating circuit 143 to the second common marker generating circuit 144 in FIG. 2 is to verify whether the second core 112 is running the user program, namely, whether the second core 112 is not in break state.

The common marker recorded in the first trace memory 151 and the common marker recorded in the second trace memory 21 are used as a synchronization point, whereby the debug system 1 can synchronize the first trace data and the second trace data with each other.

Figure 3:
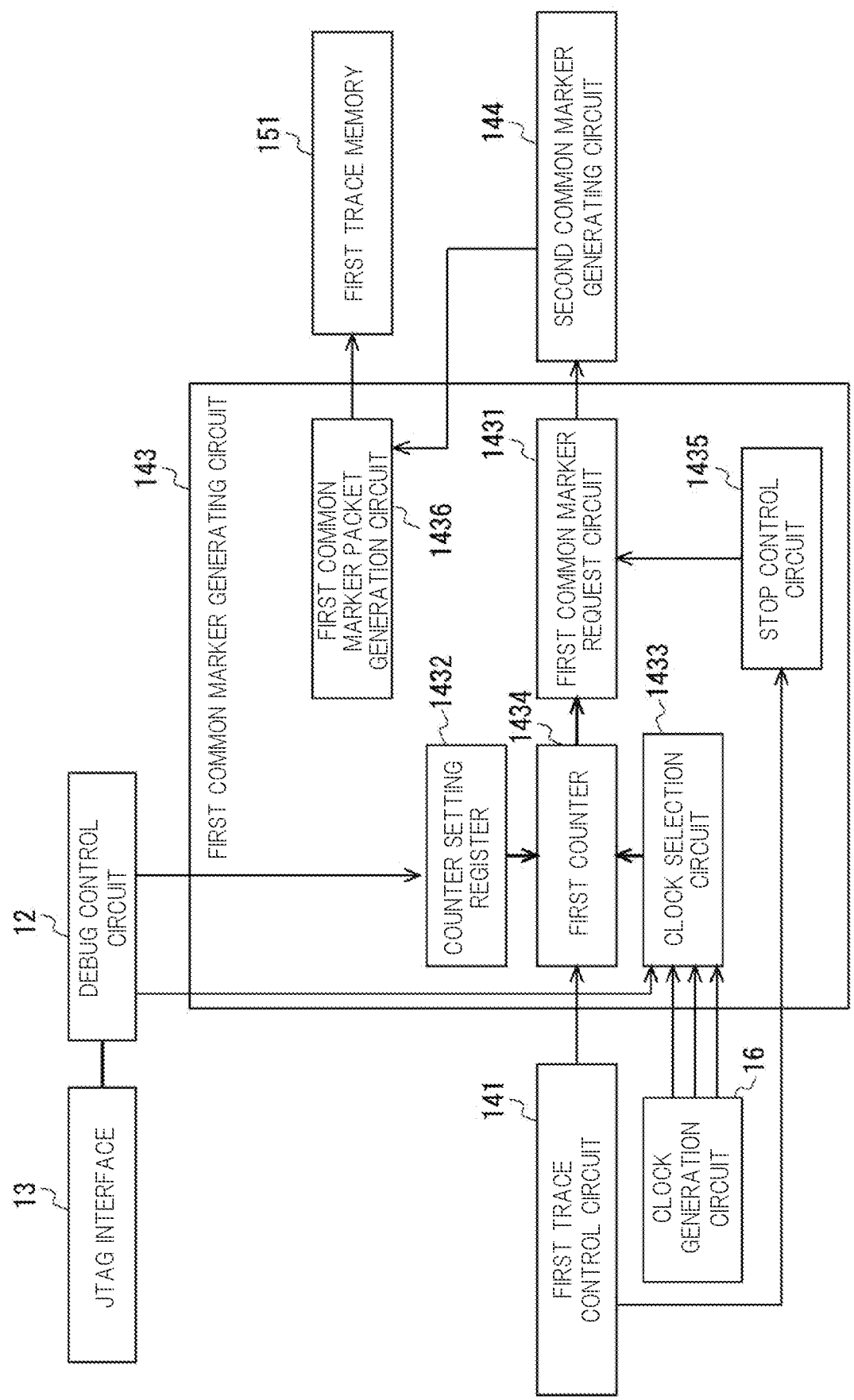
FIG. 3 is a block diagram illustrating a configuration of a first common marker generating circuit according to the first embodiment.

Next, the configuration of the first common marker generating circuit 143 illustrated in FIG. 1 will be described in detail with reference to FIG. 3. Note that the elements same as in FIG. 1 are denoted by the same reference numerals, and duplicate descriptions thereof may be omitted.

The first common marker generating circuit 143 is connected to the debug control circuit 12, the first trace memory 151, the first trace control circuit 141, a clock generation circuit 16, and the second common marker generating circuit 144.

At a time when the first core 111 starts to run a user program, namely, at a time when the first core 111 starts to record first trace data, the first trace control circuit 141 inputs a trace start signal to a first counter 1434 to be described later. At a time when to stop the recording of the first trace data, the first trace control circuit 141 outputs a stop signal to a stop control circuit 1435 to be described later.

The clock generation circuit 16 is included in the semiconductor chip 10 and inputs a plurality of types of clocks to a clock selection circuit 1433 to be described later. The plurality of clocks includes the clock on the first core 111.

The first common marker generating circuit 143 includes a counter setting register 1432, the clock selection circuit 1433, the first counter 1434, the stop control circuit 1435, the first common marker request circuit 1431, and a first common marker packet generation circuit 1436.

A counter value is set in the counter setting register 1432 via the JTAG interface 13 and the debug control circuit 12.

The clock selection circuit 1433 is configured to input any of the plurality of clocks that has been input to the first counter 1434. The clock selection circuit 1433 is configured to receive an instruction, via the JTAG interface 13 and the debug control circuit 12, from the host computer and to select a clock.

When the trace start signal is received, namely, when the first core 111 starts to run a user program, the first counter 1434 starts to count based on the input clock. It is configured such that a compare match signal is output to the first common marker request circuit 1431, if the counter value of the first counter 1434 and the counter value set in the counter setting register are identical. The first counter 1434 may reset the counter value upon sending the compare match signal.

Upon receiving the stop signal from the first trace control circuit 141, the stop control circuit 1435 stops the operation of the first common marker request circuit 1431.

Upon receiving the compare match signal from the first counter 1434, the first common marker request circuit 1431 sends the first request signal to the second common marker generating circuit 144.

Upon receiving the second request signal from the second common marker generating circuit 144, the first common marker packet generation circuit 1436 generates a common marker packet including the received common marker (ID value). The first common marker packet generation circuit 1436 sends the generated common marker packet to the first trace memory 151.

According to such a configuration, the transmission interval of the first request signal can be adjusted according to the clock selected by the clock selection circuit 1433 or according to the counter value set in the counter setting register 1432.

When the transmission interval of the first request signal is short, the receiving interval of the second request signal is also short, and hence a larger number of common markers are recorded in the first trace memory 151. If the number of common markers is too large compared to the number of first trace data, the amount of first trace data that can be recorded decreases. In contrast, if the transmission interval of the first request signal is long, the number of common markers recorded in the first trace memory 151 decreases. When the number of common markers recorded in the first trace memory 151 is small, the first trace data and the second trace data are difficult to be synchronized with each other. In particular, when no common marker is recorded in the first trace memory 151, the first trace data and the second trace data are not able to be synchronized with each other.

Next, a method of displaying the first trace data and the second trace data in synchronization will be described with reference to FIGS. 4 and 5. When the first trace data and the second trace data are not distinguished from each other, they are simply referred to as trace data.

Figures 4, 5:
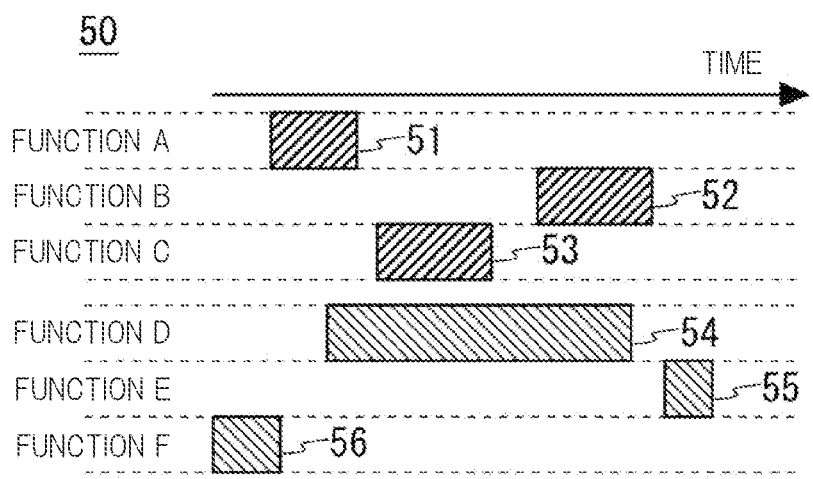
FIG. 4 is a schematic diagram illustrating an outline of data stored in a first trace memory or in a second trace memory.
FIG. 5 is a schematic diagram illustrating a screen on which first trace data and second trace data are displayed in synchronization.

FIG. 4 is a schematic diagram illustrating an overview of data stored in the first trace memory 151 or in the second trace memory. The data include a plurality of rows 41 to 49. The closer to the row 41, the earlier the data are recorded, and the closer to the row 49, the later the data are recorded. Each row includes a timestamp (also referred to as time), a program row number, a disassembled source code, an address, and data. The row 46 is data including a common marker (e.g., "10"), and the rows 41 to 45 and 47 to 49 are trace data. The disassembled source code, namely, a function in running is recorded in the trace data. A plurality of common markers may be recorded in the first trace memory 151 or in the second trace memory 21.

The host computer 30 moves data recorded in the first trace memory 151 and data recorded in the second trace memory 21 to a memory (not illustrated) in the tracing tool 22 in FIG. 1. The data recorded in the first trace memory 151 is moved via the debug control circuit 12 and the JTAG interface 13. The host computer 30 includes a mode to display each of the data recorded in the first trace memory 151 and the data recorded in the second trace memory 21 and a mode to display the first trace data and the second trace data in synchronization. The host computer 30 retrieves a common marker from the data recorded in the first trace memory 151 and from the data recorded in the second trace data, and sorts the data so as to be able to be displayed in synchronization.

The host computer 30 associates a common marker stored in the first trace memory 151 with a common marker stored in the second trace memory 21. As a result, the host computer 30 synchronizes the first trace data and the second trace data with each other. The host computer 30 may further use a timestamp to synchronize the first trace data and the second trace data with each other.

FIG. 5 illustrates a screen 50 on which the first trace data and the second trace data are displayed in synchronization based on the common marker. The horizontal axis of the screen 50 represents time based on the common marker. The screen 50 includes first graphs 51 to 53 and second graphs 54 to 56. The first graphs 51 to 53 represent the time when the first core 111 runs functions A to C and the second graphs 54 to 56 represent the time when the second core 112 runs functions D to F. On the screen 50, the first graphs 51 to 53 and the second graphs 54 to 56 are displayed in synchronization based the common marker.

By referring to FIG. 5, a user of the debug system 1 can check the running order of each function on the first core 111 and on the second core 112, and can perform debugging efficiently.

The invention made by the present inventors has been specifically described based on the embodiments, however, the present invention is not limited to the above-described embodiments, and it is obvious that various modifications can be made without departing from the scope of the present invention.

What is claimed is:

1. A semiconductor chip comprising:
a first common marker generating circuit configured to send a common marker to a first trace memory, the first trace memory being configured to store trace data from a first core and the common marker; and
a second common marker generating circuit configured to send the common marker to a second trace memory, the second trace memory being configured to store trace data from a second core and the common marker, the second core being different from the first core,
wherein the common marker allows synchronization between the trace data from the first core with the trace data from the second core,
wherein the first common marker generating circuit is configured to send, to the second common marker generating circuit, a first request signal while the first core is running a first user program, the first request signal requesting the second common marker generating circuit to send the common marker to the second trace memory,
wherein, upon receiving the first request signal from the first common marker generating circuit while the second core is running a second user program, the second common marker generating circuit is configured to i) send the common marker to the second trace memory and ii) send a second request signal to the first common marker generating circuit, the second request signal requesting the first common marker generating circuit to send the common marker to the second trace memory, and
wherein, upon receiving the second request signal from the second common marker generating circuit, the first common marker generating circuit is configured to send the common marker to the first trace memory.

2. The semiconductor chip according to claim 1, wherein the first common marker generating circuit is configured to send the first request signal at regular intervals while the first core is running the first user program.

3. The semiconductor chip according to claim 2,
wherein the first common marker generating circuit includes:
a first counter configured to start counting when the first core starts to run the first user program; and
a counter setting register in which a counter value is set, and
wherein the first common marker generating circuit is configured to send the first request signal when a counter value of the first counter matches a counter value set in the counter setting register.

4. The semiconductor chip according to claim 3, further comprising a clock selection circuit configured to select a clock, which is to be input to the first counter, from among a plurality of clocks.

5. The semiconductor chip according to claim 3, wherein a memory size of the first trace memory and a memory size of the second trace memory are different from each other.

6. A debug system comprising:
the semiconductor chip according to claim 1; and
a host computer configured to display the trace data from the first core and the trace data from the second core in synchronization based on the common marker.

7. The debug system according to claim 6, wherein the host computer is configured to display a screen on which a first graph indicating running time of a function on the first core and a second graph indicating running time of a function on the second core are synchronized based on the common marker.

8. A synchronization method using a semiconductor chip which includes i) a first common marker generating circuit configured to send a common marker to a first trace memory and ii) a second common marker generating circuit configured to send the common marker to a second trace memory, wherein the first trace memory is configured to store trace data from a first core and the common marker, wherein the second trace memory is configured to store trace data from a second core, wherein the second core is different from the first core, and wherein the common marker allows synchronize between the trace data from the first core with the trace data from the second core, the synchronization method comprising:

sending a first request signal from the first common marker generating circuit to the second common marker generating circuit while the first core is running a first user program, the first request signal requesting the second common marker generating circuit to send the common marker to the second trace memory;

if upon receiving the first request signal at the second common marker generating circuit from the first common marker generating circuit while the second core is running a second user program, i) sending the common marker from the second common marker generating circuit to the second trace memory and ii) sending a second request signal from the second common marker generating circuit to the first common marker generating circuit, the second request signal requesting the first common marker generating circuit to send the common marker to the first trace memory; and upon receiving the second request signal from the second common marker generating circuit to the first common marker generating circuit-receives the second request signal, sending the common marker from the first common marker generating circuit to the first trace memory.

9. The synchronization method according to claim 8, further comprising displaying the trace data from the first core and the trace data from the second core in synchronization based on the common marker.

* * * * *